United States Patent
Nix

(10) Patent No.: US 12,146,457 B2
(45) Date of Patent: Nov. 19, 2024

(54) SYSTEM AND METHOD FOR MANAGEMENT OF MULTIPLE EXHAUST GAS RECIRCULATION COOLERS

(71) Applicant: INNIO WAUKESHA GAS ENGINES INC., Waukesha, WI (US)

(72) Inventor: Lorne Eugene Nix, Waukesha, WI (US)

(73) Assignee: Innio Waukesha Gas Engines Inc., Waukesha, WI (US)

( * ) Notice: Subject to any disclaimer, the term of this patent is extended or adjusted under 35 U.S.C. 154(b) by 140 days.

(21) Appl. No.: 17/798,931

(22) PCT Filed: Feb. 18, 2020

(86) PCT No.: PCT/US2020/018639
§ 371 (c)(1),
(2) Date: Aug. 11, 2022

(87) PCT Pub. No.: WO2021/167593
PCT Pub. Date: Aug. 26, 2021

(65) Prior Publication Data
US 2023/0066495 A1    Mar. 2, 2023

(51) Int. Cl.
*F01N 3/10* (2006.01)
*F02M 26/24* (2016.01)
(Continued)

(52) U.S. Cl.
CPC ............ *F02M 26/33* (2016.02); *F02M 26/24* (2016.02); *F02M 26/25* (2016.02);
(Continued)

(58) Field of Classification Search
CPC ........ F02M 26/08; F02M 26/24; F02M 26/33; F02M 26/25; F02M 26/05; F02M 26/06; F02M 26/38; F02M 2026/004
See application file for complete search history.

(56) References Cited

U.S. PATENT DOCUMENTS 6,918,251 B2 *  7/2005  Yanagisawa ............ F02B 37/18
                                                   123/568.11
8,020,538 B2    9/2011  Surnilla et al.
(Continued)

FOREIGN PATENT DOCUMENTS

DE    102017111085 A1    7/2017
EP        2740924 A2    6/2014
(Continued)

OTHER PUBLICATIONS

PCT Application No. PCT/US2020/018639, International Search Report, Apr. 27, 2020, pp. 2.
(Continued)

*Primary Examiner* — Gonzalo Laguarda
(74) *Attorney, Agent, or Firm* — Fletcher Yoder, P.C.

(57) ABSTRACT

A system is provided. The system includes a controller communicatively coupled to an industrial combustion engine and an exhaust gas recirculation (EGR) system, wherein the EGR system is configured to route exhaust gas generated by the industrial combustion engine from at least one exhaust system to at least one intake system, the EGR system includes multiple EGR circuits, each EGR circuit of the multiple EGR circuits includes an EGR cooler unit including at least two of a high temperature non-condensing cooler, a low temperature condensing cooler, an adiabatic gas/liquid separator, and a reheater. The controller includes a processor and a non-transitory memory encoding one or more processor-executable routines, wherein the one or more routines, when executed by the processor, cause the controller to control operations of both the industrial combustion engine and the EGR system.

17 Claims, 9 Drawing Sheets

(51) Int. Cl.
*F02M 26/25* (2016.01)
*F02M 26/33* (2016.01)
*F02M 26/00* (2016.01)
*F02M 26/05* (2016.01)
*F02M 26/06* (2016.01)

(52) U.S. Cl.
CPC ....... *F02M 2026/004* (2016.02); *F02M 26/05* (2016.02); *F02M 26/06* (2016.02)

(56) References Cited

U.S. PATENT DOCUMENTS

| | | |
|---|---|---|
| 2007/0028901 A1 | 2/2007 | Watakabe et al. |
| 2008/0060624 A1 | 3/2008 | Grandas |
| 2009/0313992 A1 | 12/2009 | Pearson |
| 2014/0208717 A1 | 7/2014 | Moravec et al. |
| 2014/0318513 A1 | 10/2014 | Kovac et al. |
| 2018/0100471 A1* | 4/2018 | Minami .............. F02B 29/0493 |
| 2018/0119651 A1 | 5/2018 | Minami et al. |

FOREIGN PATENT DOCUMENTS

| | | |
|---|---|---|
| GB | 2473821 | 3/2011 |
| JP | H1061503 | 3/1998 |
| JP | 2009174444 A | 8/2009 |

OTHER PUBLICATIONS

Lyford-Pike, "Advanced Natural Gas Reciprocating Engines Ares," U.S. DOE Industrial Distributed Energy Portfolio Review Meeting, Jun. 1-2, 2011, pp. 1-20, Washington, D.C.

Bergmann et al., "Environment and Diesel Engines: Lower Emissions With Exhaust Gas Recirculation," Navel Forces III, 2006, pp. 60-65, Navel Technology.

Bining "California Advanced Reciprocating Internal Combustion Engine (ARICE) Program and Collaborative—Status and Update," 3rd Annual Advanced Stationary Reciprocating Engines Meeting, Jun. 28-30, 2006, pp. 1-28, Argonne National Laboratory, Argonne, IL.

"CIMAC Position Paper, Gas Engine Aftertreatment Systems," International Council of Combustion Engines, May 2017, pp. 1-12, @ The CIMAC Central Secretariat.

Ghassembaglou et al., "Optimum Design of Heat Exchanger in Diesel Engine Cold EGR for Pollutants Reduction," International Scholarly and Scientific Research & Innovation, 2014, pp. 1885-1891, vol. 8, No. 11, World Academy of Science, Engineering and Technology International Journal of Mechanical and Mechatronics Engineering.

Kech et al., "Exhaust Gas Recirculation: Internal Engine Technology for Reducing Nitrogen Oxide Emissions," Engine technology, Aug. 2011, MTU Friedrichshafen GmbH A Rolls-Royce Power Systems Company, pp. 1-4.

Keller et al., "EGR System Analysis off a Turbocharged Diesel Engine," GT-SUITE User's Conference, Nov. 14, 2006, pp. 27.

Lyford-Pike, "Advanced Natural Gas Reciprocating Engine(s)," DoE Program Award No. DE-FC26-01CH11078, Jun. 27, 2014, pp. 1-45, Columbus, IN.

Shutty et al., "Control Strategy for a Dual Loop EGR System to Meet Euro 6 and Beyond," Directions in Engine-Efficiency and Emissions Reduction Research (DEER) Conference, Aug. 3-6, 2009, pp. 1-22, Dearborn, Michigan.

Stachowicz et al., "Design and Development of Waukesha's, Stoichiometric, Cooled EGR Engine for the California ARICE Program," Proceedings of ICEF 2005 ASME Internal Combustion Engine Division 2005 Fall Technical Conference, Sep. 11-14, 2005, pp. 1-11, ASME, Ottawa, Canada.

Willis, " Caterpillar Teams Up With The Energy Institute At Colorado State University," gascompressionmagazine.com, Sep. 2019, pp. 80-83.

Gupta, "Technologies for Gaseous Fueled Advanced Reciprocating Engine Systems," U.S. DOE Industrial Distributed Energy Portfolio Review Meeting, Jun. 1-2, 2011, pp. 1-33, U.S. Department of Energy, Washington, D.C.

European extended Search Report for Application No. EP 20 92 0531 dated Jul. 20, 2023, 12 pgs.

Japanese Patent Application No. 2022-552285, Notice of Allowance issued on Jun. 16, 2024 and translation, 5 pgs.

Japanese Patent Application No. 2022-552285, Notice of Allowance issued on Jan. 16, 2024 and translation, 5 pgs.

\* cited by examiner

SYSTEM AND METHOD FOR MANAGEMENT OF MULTIPLE EXHAUST GAS RECIRCULATION COOLERS

CROSS-REFERENCE TO RELATED APPLICATION

This application is a National Stage entry from, and claims benefit of, PCT Application No. PCT/US2020/018639, filed on Feb. 18, 2020; entitled "System And Method For Management Of Multiple Exhaust Gas Recirculation Coolers", which is herein incorporated by reference in its entirety.

BACKGROUND

The subject matter disclosed herein relates to internal combustion engines and, more particularly, to the management of multiple exhaust gas recirculation coolers for an industrial internal combustion engine.

Exhaust gas recirculation (EGR) involves introduction of a portion of exhaust gases from an internal combustion engine back into a combustion chamber of the internal combustion engine, such as one or more cylinders of the internal combustion engine. EGR can be used to reduce formation of nitrogen oxides, such as, for example, nitrogen oxide (NO) and nitrogen dioxide ($NO_2$) (referred to collectively hereinafter as $NO_x$). The exhaust gas is substantially inert. Thus, introducing a portion of the exhaust gas into the combustion chamber of an internal combustion engine dilutes the mixture of fuel and air to be combusted, and resultantly lowers the peak combustion temperature and excess oxygen. As a result, the engine produces reduced amounts of NOx because $NO_x$ forms in higher concentrations at higher temperatures. Thus, EGR reduces or limits the amount of $NO_x$ generated during combustion of the engine.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system is provided. The system includes an industrial combustion engine including at least one intake system and at least one exhaust system. The system also includes an exhaust gas recirculation (EGR) system coupled to the industrial combustion engine and configured to route exhaust gas generated by the industrial combustion engine from the at least one exhaust system to the at least one intake system. The EGR system includes a first EGR cooler unit for a first set of cylinders of the industrial combustion engine disposed along a first EGR circuit. The EGR system also includes a second EGR cooler unit for a second set of cylinders of the industrial combustion engine disposed along a second EGR circuit, wherein the first and second EGR cooler units each include at least two of a high temperature non-condensing cooler, a low temperature condensing cooler, an adiabatic gas/liquid separator, and a reheater. The first and second EGR cooler units are coupled with first and second EGR valves, respectively, configured to enable flow of the exhaust gas from the first and second EGR circuits, respectively, to the industrial combustion engine. The system further includes a controller communicatively coupled to the industrial combustion engine and the EGR system, wherein the controller includes a processor and a non-transitory memory encoding one or more processor-executable routines, wherein the one or more routines, when executed by the processor, cause the controller, via signals sent to actuators, to manage flow of the exhaust gas to the industrial combustion engine by modulating the first and second EGR valves.

In a second embodiment, a system is provided. The system includes a controller communicatively coupled to an industrial combustion engine and an exhaust gas recirculation (EGR) system, wherein the EGR system is configured to route exhaust gas generated by the industrial combustion engine from at least one exhaust system to at least one intake system, the EGR system includes multiple EGR circuits, each EGR circuit of the multiple EGR circuits includes an EGR cooler unit including at least two of a high temperature non-condensing cooler, a low temperature condensing cooler, an adiabatic gas/liquid separator, and a reheater. The controller includes a processor and a non-transitory memory encoding one or more processor-executable routines, wherein the one or more routines, when executed by the processor, cause the controller, via control signals sent to actuators, to manage flow of the exhaust gas to the industrial combustion engine by completely opening respective EGR valves disposed along the plurality of EGR circuits and modulating a shared EGR valve shared by the plurality of EGR circuits downstream of the respective EGR valves to adjust the flow of the exhaust gas to the industrial combustion engine, by completely opening the shared EGR valve and modulating the respective EGR valves to adjust the flow of the exhaust gas to the industrial combustion engine, or partially open the respective EGR valves and the shared EGR valve to adjust the flow of the exhaust gas to the industrial combustion engine.

In a third embodiment, a method is provided. The method includes utilizing a controller communicatively coupled to an industrial combustion engine and an exhaust gas recirculation (EGR) system and including a non-transitory memory and a processor to initially activate, via control signals, only one EGR circuit of a plurality of EGR circuits of the EGR system during a first cold start of the industrial combustion engine and then subsequently activate each EGR circuit of the plurality of EGR circuits when the controller detects, based on feedback received from sensors, that an operating parameter of the industrial combustion engine is approaching an outer limit of a specified range. The method also includes initially activating, via the control signals, whichever of the multiple EGR circuits was not activated during the first cold start of the industrial combustion engine during a second cold start of the industrial combustion engine and initially activate the EGR circuit that was initially activated during the first cold start during a subsequent hot start of the industrial combustion engine, wherein the second cold start or the subsequent hot start is the next start after the first cold start, and wherein each EGR circuit of the multiple EGR circuits includes an EGR cooler unit that includes multiple functional sections.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure enable the control or management of an exhaust gas recirculation (EGR) system for an industrial combustion engine (e.g., configured to generate 2 megawatts (MW) of power). As described in greater detail below, the EGR system includes multiple EGR circuits that each include an EGR cooler unit that includes multiple functional sections. For example, each EGR cooler unit may include at least two of the following sections: a high temperature non-condensing cooler, a low temperature condensing cooler, an adiabatic gas/liquid separator, and a reheater. In addition, each EGR circuit may include a thermostatically controlled bypass valve that when open enables the exhaust to bypass each cooler within a respective EGR cooler unit. A controller is communicatively coupled to both the industrial combustion engine and the EGR system that enables control of the operations of both the industrial combustion engine and the EGR system. Management of the multiple EGR circuits (and EGR cooler units) provides redundancy and extra capacity as well as additional functionality. For example, as described in greater detail below, multiple EGR cooler units enables online manipulation of EGR heat rejection, utilization of one EGR circuit while the engine is derated (i.e., engine is operated at less than maximum power) if another EGR circuit is disabled, EGR distribution management, sequential warm-up, and other functionalities.

Figure 1:
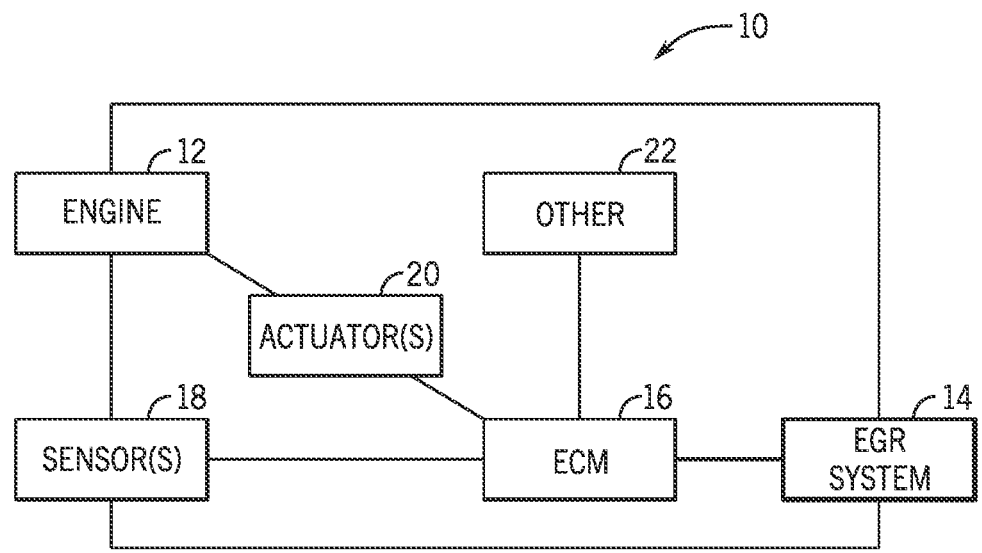
FIG. 1 is a block diagram of an engine driven power generation system, in accordance with an embodiment.

One example of an engine driven power generation system 10 is illustrated in FIG. 1. It should be noted that the engine generates and outputs the power, but the application of the power may be for electrical power generation, gas compression, mechanical drive, cogeneration (e.g., combined heat and power), trigeneration (e.g., combined heat, power, and industrial chemicals for greenhouse applications), or other applications. The system includes an engine 12 (e.g., reciprocating internal combustion engine) coupled to an exhaust gas recirculation (EGR) system 14. The system 10 is adapted for utilization in stationary application (e.g., industrial power generating engines or stationary reciprocating internal combustion engines). Although in certain embodiments, the techniques described may be utilized in mobile applications (e.g., marine or locomotive). In certain embodiments, the system 10 may generate power greater than 2 megawatts (MW). In other embodiments, the system 10 may generate less than 2 MW of power (e.g., between 1 MW and 2 MW of power, or even less than 1 MW of power). The system 10 may also operate the engine 12 at a stoichiometric air fuel equivalence ratio (e.g., $\lambda=1$) while utilizing EGR as a diluent. Operating the engine 12 under stoichiometric conditions enable an exhaust aftertreatment system (e.g., 3-way catalyst) to be utilized by the system 10 to reduce emissions. It should be noted that the lambda setpoint may be rich (e.g., $\lambda$ is less than 1.0), in some modes of operation. The major determiner for the actual $\lambda$ is dictated by emissions output, commonly referred to as "stack-out", from the exhaust aftertreatment system. In certain embodiments, operation may target a specific $\lambda$ value or dither within a $\lambda$ range, at a specific frequency, to achieve the desired "stack-out" emissions. It is typical to operate stoichiometric/rich burn-engines with $\lambda$ of 0.96 to 1.04, but this is mainly determined by the specific exhaust aftertreatment system (e.g., precious metal loadings, coatings, temperature, etc.). Variations in $\lambda$ have dynamic implications on the EGR system 14 that are accounted for by the ECM 16. In certain embodiments, the system 10 may also operate the engine under lean burn conditions while also utilizing the EGR as a diluent and an exhaust aftertreatment system (e.g., two-way oxidation catalytic converters ("Oxi-Cat") and/or Selective Catalytic Reduction (SCR) actively injecting a reductant into the catalyst (such as, but not necessarily limited, to ammonia or urea)).

As described in greater detail below, due to heat rejection requirements and EGR cooler physical sizing, the EGR system 14 may include multiple EGR circuits with each EGR circuit including an EGR cooler unit. Each EGR cooler unit may include multiple functional sections. The EGR system 14 may utilize a high pressure loop EGR system (e.g., exhaust gas is diverted from upstream of the turbine of a turbocharger and reintroduced into the intake system after the compressor) or a low pressure loop EGR system (e.g., exhaust gas is diverted from downstream of the turbine of a turbocharger and reintroduced into the intake system before the compressor of the turbocharger). The utilization of multiple EGR circuits/cooler units by the EGR system 14 increases the degrees of freedom in managing the system 14 to generate redundancy, extra capacity, and additional functionality. For example, multiple EGR cooler units enables online manipulation of EGR heat rejection, utilization of one EGR circuit while the engine is derated if the other EGR circuit is disabled, EGR distribution management, sequential warm-up, and other functionalities.

The engine 12 may be a two-stroke engine, four-stroke engine, or other type of engine 12. In particular, embodiments, the engine 12 is a four-stroke engine. The engine 12 may also include any number of combustion chambers, pistons, and associated cylinders (e.g., 1-24) in one (e.g. inline) or more (e.g., left and right cylinder banks) cylinder banks of a V, W, VR (a.k.a. Vee-Inline), or WR cylinder bank configuration. For example, in certain embodiments, the system 8 may include a large-scale industrial reciprocating engine having 6, 8, 12, 16, 20, 24 or more pistons reciprocating in cylinders. In some such cases, the cylinders and/or the pistons may have a diameter of between approximately 13.5-31 centimeters (cm). In certain embodiments, the cylinders and/or the pistons may have a diameter outside of the above range. The fuel utilized by the engine 12 may be any suitable gaseous fuel, such as natural gas, associated petroleum gas, hydrogen ($H_2$), propane ($C_3H_8$), biogas, sewage gas, landfill gas, coal mine gas, butane ($C_4H_{10}$), ammonia ($NH_3$) for example. The fuel may also include a variety of liquid fuels, such as gasoline, diesel, methanol, or ethanol fuel. The fuel may be admitted through either a high pressure (blow-through) fuel supply system or low pressure (draw-through) fuel supply system or direct injection. In certain embodiments, the engine 12 may utilize spark ignition. In other embodiments, the engine 12 may utilize compression ignition.

The system 10 includes an engine control module (ECM) or engine control unit (ECU) 16 (e.g., controller) operably coupled to communicate with the engine 12 and the EGR system 14. In addition, the ECM 16 is operably coupled to communicate with one or more sensors 18 and one or more actuators 20. The ECM 16 may be a single controller or multiple controllers housed in the same or separate housings. The sensors 18 may be coupled to one or more components of the engine 12, the EGR system 14, or other component of the engine system 10, and sense one or more operating characteristics of the engine 12, the EGR system 14, and/or the engine system 10 and output a signal representative of the operating characteristic. Some examples of typical engine operating characteristics include engine speed; a torque indicating characteristic, such as Intake Manifold Absolute Pressure (IMAP) or intake manifold density (IMD); a characteristic indicative of the power output of the engine determined from inputs into the engine, such as Brake Mean Effective Pressure (BMEP) or Indicated Mean Effective Pressure (IMEP) or other estimate; a characteristic indicative of the engine's air to fuel equivalence ratio, such as exhaust oxygen content; ambient and/or engine temperature; ambient pressure; ambient humidity; and others. Some examples of other characteristics that may be measured by sensors 18 include a power output of the engine from outputs of the engine, for example, a generator driven by the engine, a throughput and pressure of a compressor driven by the engine, an engine loading measured with load cell and others. The actuators 20 are adapted to control various engine system components (not specifically shown) used in controlling the engine 12, the EGR system 14, and other engine system components. Some examples of typical engine components include a throttle, a turbocharger, a turbocharger compressor bypass or wastegate, air/fuel regulating device, such as an adjustable fuel mixer, a fuel pressure regulator, fuel injectors, carburetor, one or more EGR valves and others. The ECM 16 may also be coupled to communicate with other components 22. Some examples of other components 22 can include a user interface that allows a user to query the ECM 16 or input data or instructions to the ECM 16, one or more external sensors that sense information other than the operating characteristics of the engine or engine system, monitoring or diagnostic equipment to which the ECM 16 can communicate characteristics of the system, a load driven by the engine (e.g., generator, compressor, or other load) and others.

Figure 2:
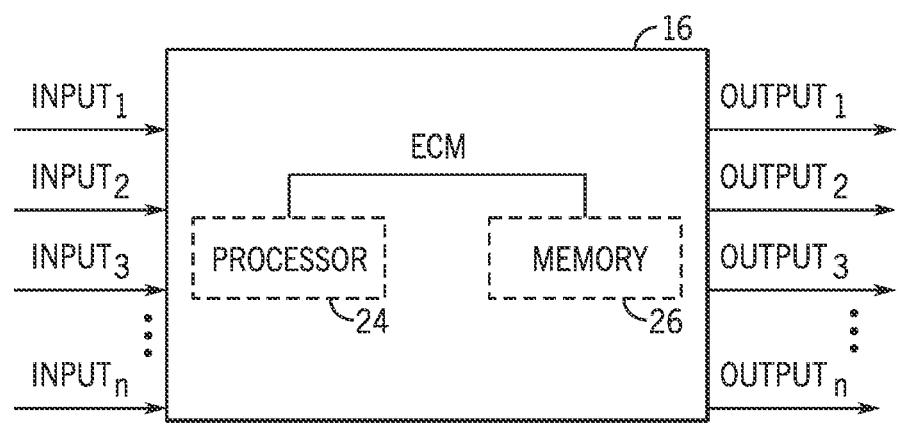
FIG. 2 is a schematic diagram of an engine control module (ECM) for use in the engine driven power generation system, in accordance with an embodiment.

Referring to FIG. 2, the ECM 16 includes a processor 24 operably coupled to a non-transitory computer readable medium or memory 26. The computer readable medium 26 may be wholly or partially removable from the ECM 16. The computer readable medium 26 contains instructions used by the processor 24 to perform one or more of the methods described herein. More specifically, the memory 26 may include volatile memory, such as random access memory (RAM), and/or non-volatile memory, such as read-only memory (ROM), optical drives, hard disc drives, or solid-state drives. Additionally, the processor 24 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The ECM 16 can receive one or more input signals ($input_1 \ldots input_n$), such as from the sensors 18, actuators 20, and other components 22 and can output one or more output signals ($output_1 \ldots output_n$), such as to the sensors 18, actuators 20 and other components 22.

Figure 10:
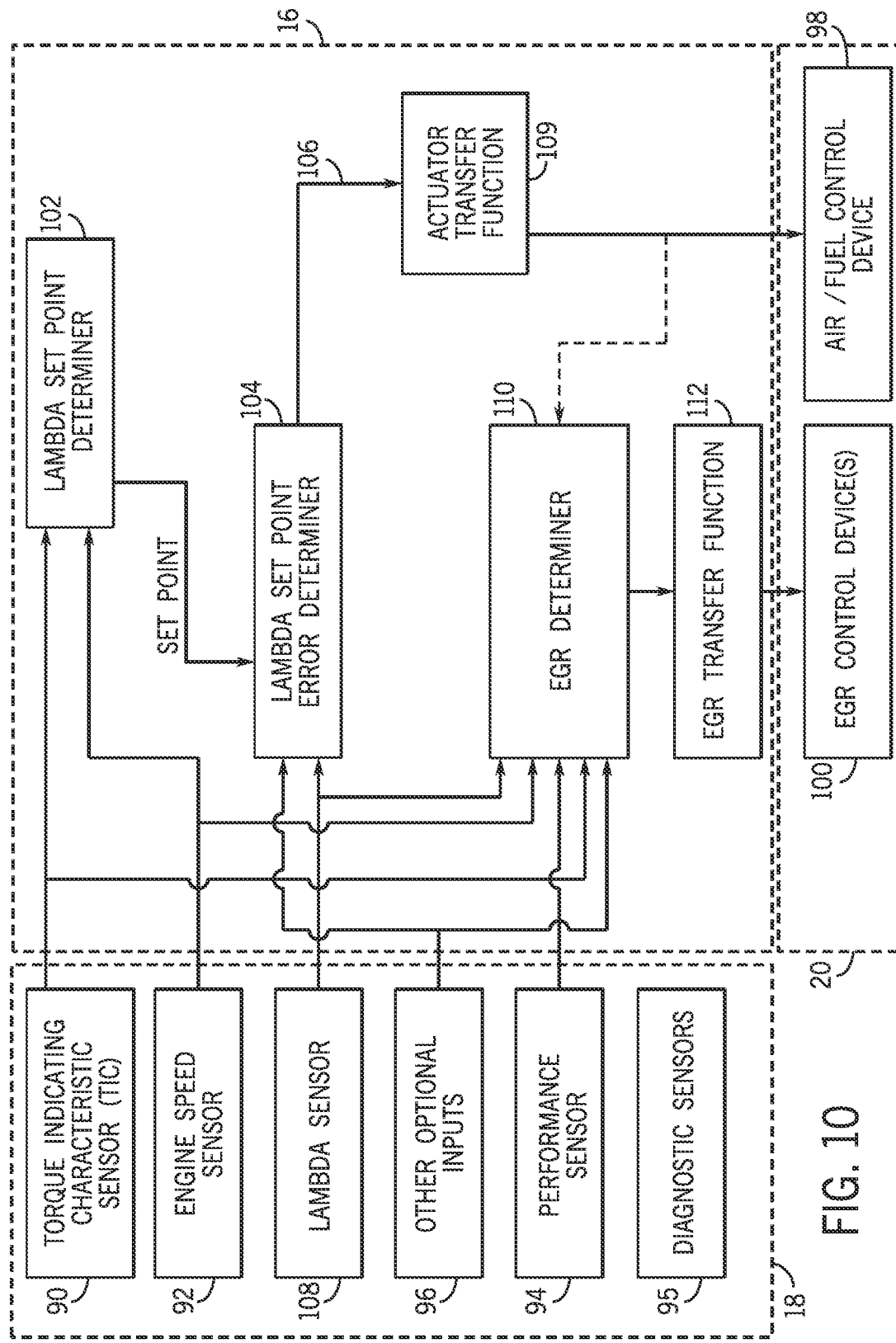
FIG. 10 is a schematic diagram of the functional operation of the ECM of FIG. 2, in accordance with an embodiment.

The ECM 16 operates the engine 12 (FIG. 1) to a specified operating state, for example a specified speed, torque output, or other specified operating state, and maintain the engine in steady state operation. To this end, the ECM 16 receives input from the sensors 18, including engine state parameters, and determines and outputs one or more actuator control signals adapted to control the actuators 20 to operate the engine 12. The ECM 16, as described in greater detail below, also operates the EGR system 14 based on the input from the sensors 18. The following are non-limiting examples of sources (e.g., sensors, techniques, etc.) that the ECM 16 may utilize in estimating or calculating an amount or rate of EGR flow: Coriolis flow meter, hot wire anemometer, laminar flow meter, ultrasonic flow meter, Vortex shedding meter, differential pressure ($\Delta P$; across engine, EGR circuit, or individual component), and net difference method (fuel for power, air for λ, total from speed density). In certain embodiments, an additional method for estimating or calculating an amount or rate of EGR flow includes sampling gas concentrations of each chemical component (e.g., $CO_2$, CO, $NO_x$, $N_2O$, VOCs, HC, $CH_2O$, $NH_3$, etc.) from the intake system and comparing these to the additional flow streams that makeup the intake system flow (e.g., ambient air, fuel, closed crankcase ventilation (CCV), and EGR) as part of the total engine flow. Some of these chemical components only come from the exhaust (i.e., EGR). Thus, if the intake system concentrations are measured then a percent volumetric EGR flow can be estimated as it will be proportional when correcting for the state properties of the flow streams. FIG. 10 provides a more specific non-limiting example for the ECM 16.

Figure 3:
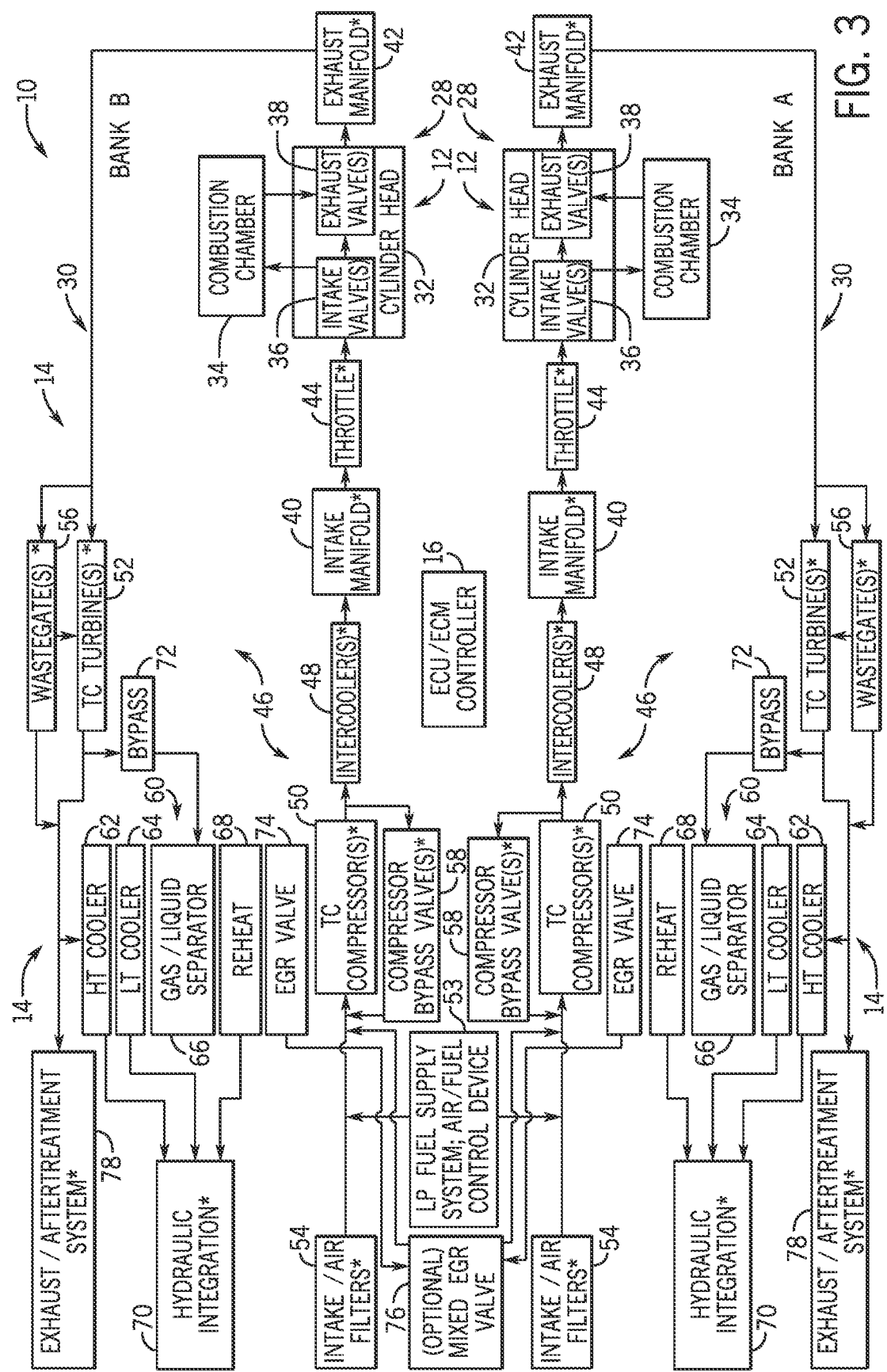
FIG. 3 is a schematic diagram of the engine driven power generation system of FIG. 1 utilizing a low pressure loop EGR system, in accordance with an embodiment.

FIGS. 3-8 describe various embodiments of the engine driven power generation system 10. FIG. 3 is a schematic diagram of the engine driven power generation system 10 of FIG. 1 utilizing a low pressure loop EGR system (e.g., exhaust gas is diverted from downstream of the turbine of the turbocharger (TC) and reintroduced into the intake system before the compressor of the turbocharger (TC)). Various components of the system 10 illustrated in FIG. 3, although illustrated as multiple components, may be shared across engine cylinder banks as indicated by asterisks. As depicted, the engine 12 includes multiple cylinder banks 28 (e.g., bank A and bank B, but typically referred to a left and right cylinder banks respectively) and multiple EGR circuits 30. As depicted, the system 10 includes two EGR circuits 30 in parallel. The number of EGR circuits 30 may vary (e.g., 2, 3, 4, or more). In addition, in certain embodiments, the EGR circuits 30 may be arranged in series. Each combustion chamber 34 includes a respective cylinder head. Each cylinder head 32 includes multiple assemblies including a respective piston disposed within a respective cylinder (not shown). Fuel is provided to a combustion chamber 34 in each cylinder while an oxidant (e.g., air) is provided to the combustion chamber 34 via an intake valve(s) 36 where combustion occurs and an exhaust valve(s) 38 controls discharge of exhaust from the engine 12. Each cylinder bank 28 includes an intake manifold 40 (or intake system), an exhaust manifold 42 (or exhaust system), and a throttle 44. The throttle 44, compressor bypass valve 58, and wastegate 56 are the primary power controls that define the amount of oxidant/fuel delivered to the combustion chamber 34. In certain embodiments, other power controls may include variable turbine geometry or variable valve timing.

As illustrated, the system 10 also includes turbochargers 46 and intercoolers 48 (e.g., a heat exchanger) associated with each EGR circuit 30. In certain embodiments, an e-compressor (e.g., having an electric motor coupled to a compressor) may be utilized in place of the turbocharger 46. In certain embodiments, a multi-stage turbocharging system may be utilized. Each turbocharger 46 includes a compressor 50 coupled to a turbine 52 (e.g., via a drive shaft (not shown)). Air (e.g., oxidant) is provided via an intake 54. In certain embodiments, air filters may be disposed within the intake 54. The turbine 52 is driven by exhaust gas to drive the compressor 50, which in turn compresses the intake air, fuel, and EGR flow for intake into the intake manifold 40 after cooling by the intercoolers 48. In addition, fuel is supplied from a fuel supply system 53 downstream of the intake 54 and upstream of the compressor 50. As depicted, the fuel supply system 53 is a low pressure (draw-through) fuel supply system. In a low pressure (LP) fuel system, low gas pressure is utilized by mixing the gas (fuel) with air at atmospheric pressure, or slightly sub-atmospheric pressure, before the compressor 50. The air fuel mixture is then drawn though the compressor 50 and compressed. Since the fuel mixes at ambient conditions, changes in these conditions will affect engine performance. Typical gas (fuel) pressures to the engine fuel regulator fall in the range of 0.5 to 5 psig. In certain embodiments, the fuel supply system 53 may be a high pressure (HP) fuel supply system. With a high pressure fuel system, a turbocharged engine needs gas (fuel) supply pressures to be greater than the boost pressure produced by the compressor 50. Since the fuel is introduced to the air stream after the air passes through the compressor 50, this differential pressure (i.e., gas over air pressure) allows for proper blending of the fuel and air in the carburetor. Typical gas (fuel) pressures to the engine fuel regulator fall in the range of 12 to 90 psig. In certain embodiments, the fuel supply system 53 may include a control device to regulate the air and fuel provided to the engine 12.

A wastegate 56 (e.g., wastegate valve) may be disposed between exhaust manifold discharge and the exhaust system to regulate the turbocharger 46 by diverting exhaust energy from the turbine 52. The wastegate 46 functionally regulates the amount of engine exhaust provided to the turbine 52 of the turbocharger 46 and thus the compressor discharge pressure produced by the compressor 50. The wastegate 56 may be of an integral type (e.g., with the turbine 52), an electronically controlled wastegate (e-wastegate), or a pneumatic wastegate that senses pressure elsewhere within the system 10. The system 10 may also include a respective bypass valve 58 (e.g., compressor bypass valve (CBV)) associated with each compressor 50 of each turbocharger 46 to control pressure by diverting a portion of the intake flow to the engine 12. As depicted the compressor bypass valve 58 is separate from the compressor 50. In certain embodiments, the compressor bypass valve 58 is integrated within the compressor 50.

Disposed downstream of each turbine 52 along the EGR circuit 30 is an EGR cooler unit 60. In certain embodiments, each EGR cooler unit 60 includes multiple functional segments. As depicted, each EGR cooler unit 60 includes a high temperature non-condensing cooler 62, a low temperature condensing cooler 64, an adiabatic gas/liquid separator 66, and a reheater 68. The reheater 68 may utilize engine coolant, sometimes referred to as jacket water to heat the EGR flow to the desired temperature. Each of the high temperature non-condensing cooler 62, the low temperature condensing cooler 64, and reheater 68 may include a separate coolant line, known as an auxiliary coolant circuit, or may utilize jacket water. In addition, the high temperature non-condensing cooler 62, the low temperature condensing cooler 64, and reheater 68 may be interconnected to a hydraulic integration circuit 70, which may be part of the Balance of Plant (BoP). In certain embodiments, each EGR cooler unit 60 includes at least two of these functional sections. In certain embodiments, each EGR cooler unit 60 may include more than one of each functional section. The system 10 includes a bypass valve 72 (e.g., thermostatically controlled bypass valve) disposed between the EGR circuit 30 and the EGR cooler unit 60. The bypass valve 72 may be reacting to a local temperature or controlled by the ECM 16 (e.g., via an actuator). The bypass valve 72 (e.g., when open) directs the EGR flow to the gas/liquid separator 66, thus, bypassing the coolers 62, 64.

Each EGR circuit 30 of the EGR system 14 includes an EGR valve 74 disposed downstream from the exhaust manifold 42 and upstream from the compressor 50. In particular, the EGR valve 74 is located on the cold side of the respective EGR cooler unit 60 to keep it near ambient temperature. The EGR valve 74 when opened enables EGR flow to the compressor 50 and subsequently to the intake manifold 40 of the engine 12. As depicted, these EGR valves 74 are disposed in parallel relative to each other. As depicted, a shared or mixed EGR valve 76 is disposed downstream of the EGR valves 74. The EGR valve 76 enables the modulation (and mixing) of the EGR flows from each of the EGR circuits 30. The EGR valve 76 is disposed in series with each of the EGR valves 74. In certain embodiments, the EGR system 14 may not include the EGR valve 76 and the EGR flow may be directly provided upstream of the compressor 50.

Although a portion of the exhaust in each circuit 30 is diverted toward the EGR cooler units 60, the remaining portion of the exhaust is diverted to an exhaust aftertreatment system 78. In certain embodiments, the exhaust aftertreatment system 78 may include a three-way catalyst to reduce exhaust emissions (e.g., nitrogen oxides ($NO_x$), hydrocarbons (HC), carbon monoxide (CO), and other emissions).

Various components (or actuators for these components) of the system 10, the engine 12, and the EGR system 14 may be in communication with the ECM 16. For example, the EGR valves 74, 76, the throttles 44, the compressor bypass valves 58, the wastegate valves 56, the bypass valves 72, and/or the fuel supply system 53 (including the air/fuel control device) may be communicatively coupled to the ECM 16 to enable the ECM 16 to control these components.

Figure 4:
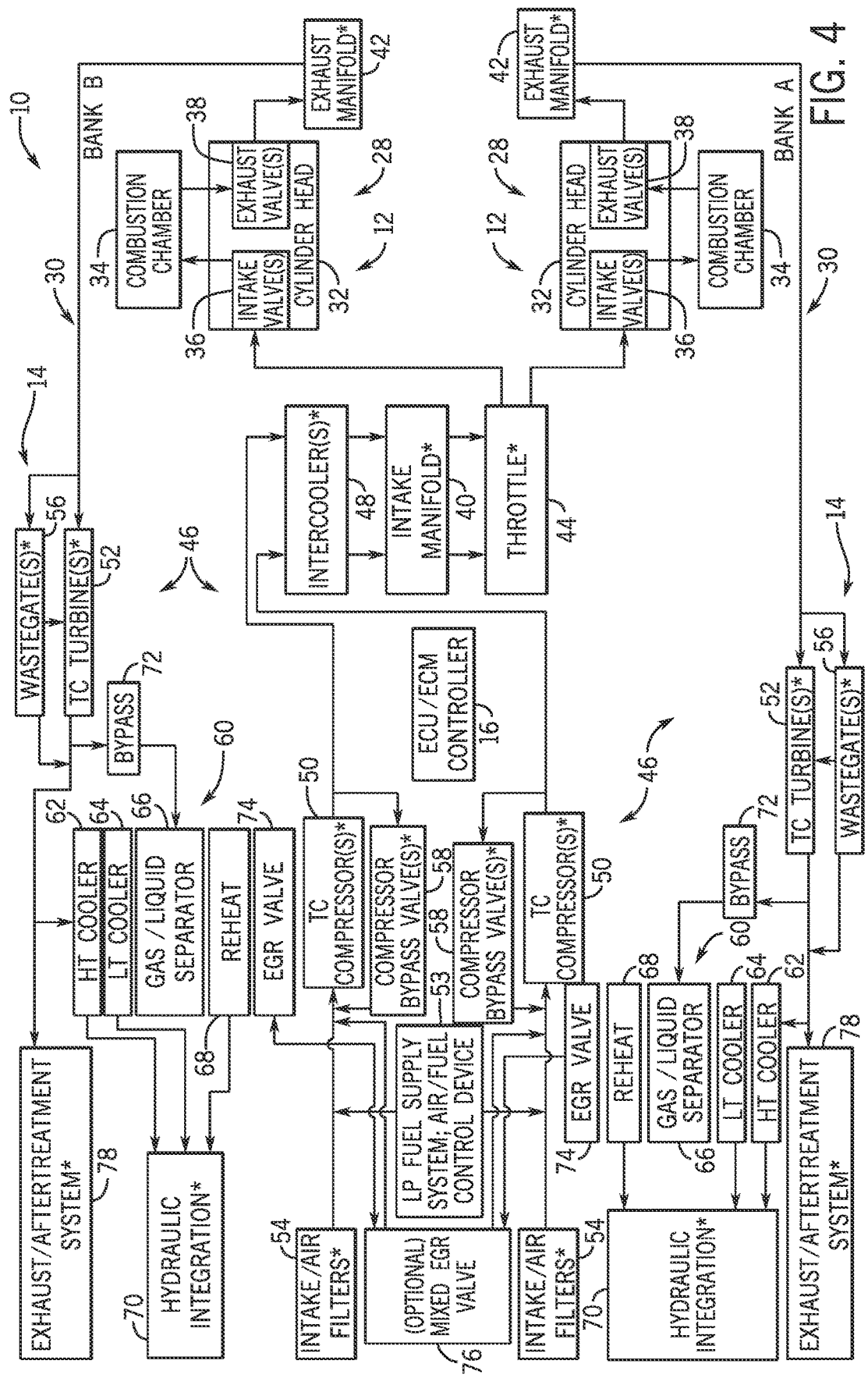
FIG. 4 is a schematic diagram of the engine driven power generation system of FIG. 1 utilizing a low pressure loop EGR system (e.g., sharing an intake manifold), in accordance with an embodiment.
Figure 5:
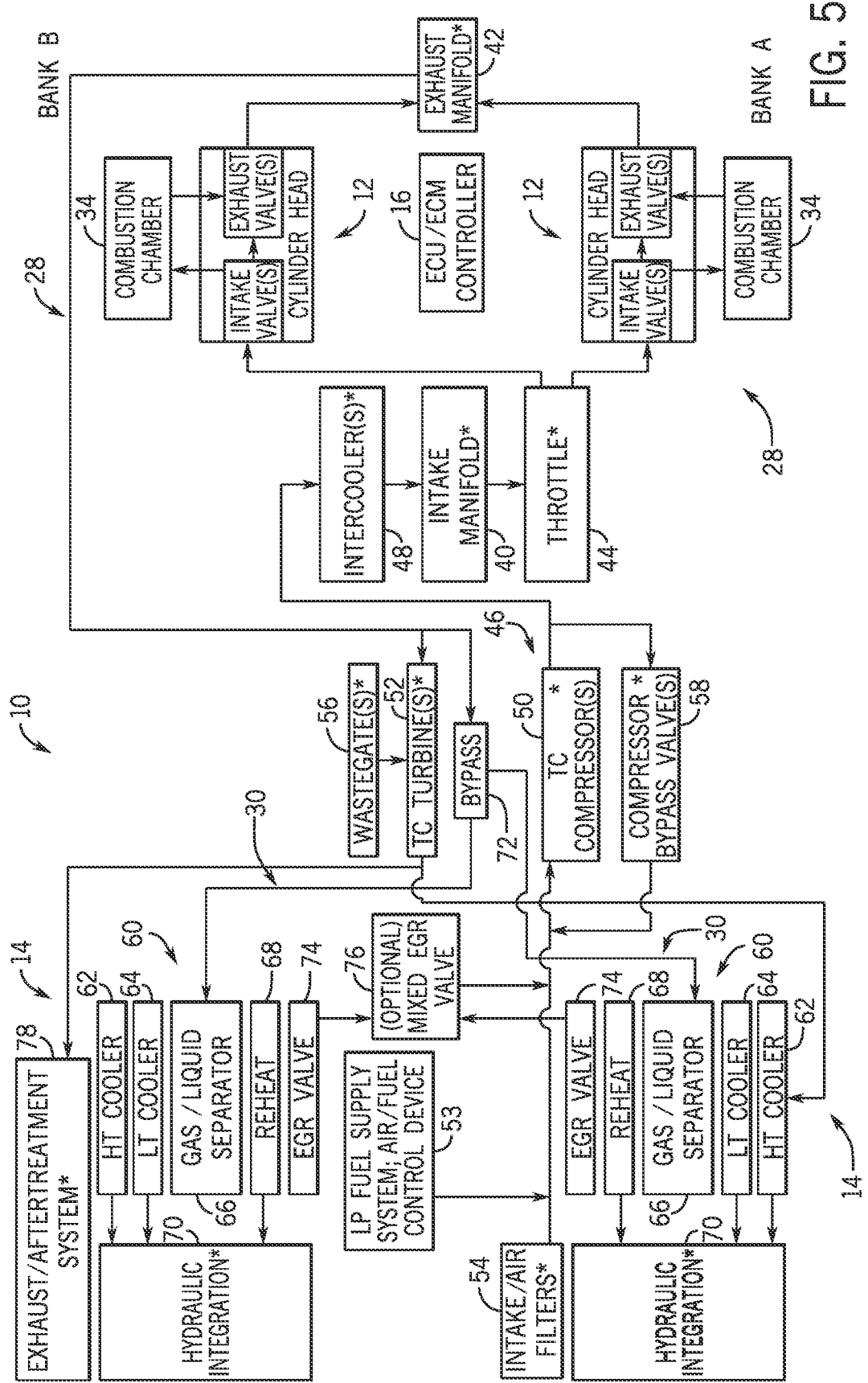
FIG. 5 is a schematic diagram of the engine driven power generation system of FIG. 1 utilizing a low pressure loop EGR system (e.g., sharing an intake manifold and an exhaust manifold), in accordance with an embodiment.

As mentioned above, certain components of the system 10 may be shared (e.g., across the cylinder banks 28). FIG. 4 is a schematic diagram of the engine driven power generation system 10 of FIG. 1 utilizing a low pressure loop EGR system (e.g., sharing the intake manifold 40). The system 10 depicted in FIG. 4 is as described in FIG. 3 except the following components are shared across the cylinder banks 28 to accommodate sharing the intake manifold 40: the intercoolers 48, the intake manifold 40, and the throttle 44. FIG. 5 is a schematic diagram of the engine driven power generation system 10 of FIG. 1 utilizing a low pressure loop EGR system (e.g., sharing the intake manifold 40 and an exhaust manifold 42). The system 10 depicted in FIG. 5 is as described in FIG. 3 except the following components are shared across the cylinder banks 28 to accommodate sharing the intake manifold 40 and the exhaust manifold 42: the intake 54, the wastegate 56, the compressor bypass valve 58, the intercoolers 48, the intake manifold 40, the throttle 44, the turbocharger 46 (including the compressor 50 and the turbine 52), the exhaust aftertreatment system 78, and the exhaust manifold 42. In these embodiments, other components may be shared.

Figure 6:
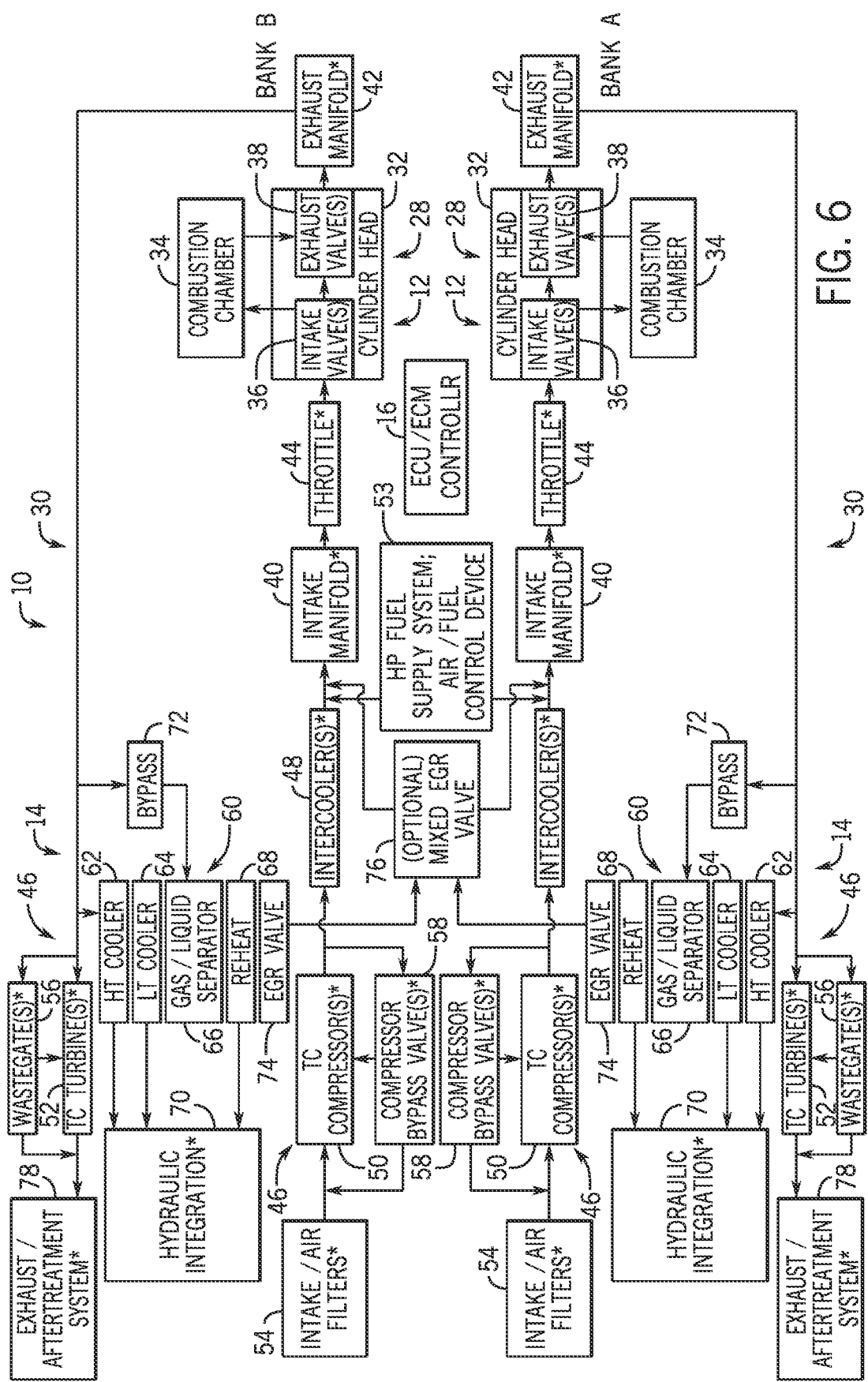
FIG. 6 is a schematic diagram of the engine driven power generation system of FIG. 1 utilizing a high pressure loop EGR system, in accordance with an embodiment.

FIG. 6 is a schematic diagram of the engine driven power generation system 10 of FIG. 1 utilizing a high pressure loop EGR system (e.g., exhaust gas is diverted from upstream of the turbine and reintroduced into the intake manifold after the compressor). Various components of the system 10 illustrated in FIG. 6, although illustrated as multiple components, may be shared across engine cylinder banks as indicated by asterisks. The system 10 in FIG. 6 is as described in FIG. 3 except for a few differences. As depicted in FIG. 6, the EGR cooler unit 60 of each EGR circuit is disposed downstream of the exhaust manifold 42 and upstream of the turbine 52. In addition, the EGR flow is introduced from the EGR cooler unit 60 downstream of the compressor 50 between the intercoolers 48 and the intake manifold 40. Further, the fuel is introduced within the air and exhaust between the intercoolers 48 and the intake manifold 40. As depicted, the fuel supply system 53 is a high pressure (blow-through) fuel supply system. In certain embodiments, the high pressure fuel supply system 53 may take the form of individual gas mixing achieved by intake port injection (not shown). In certain embodiments, the fuel supply system 53 may be a low pressure fuel supply system.

Figure 7:
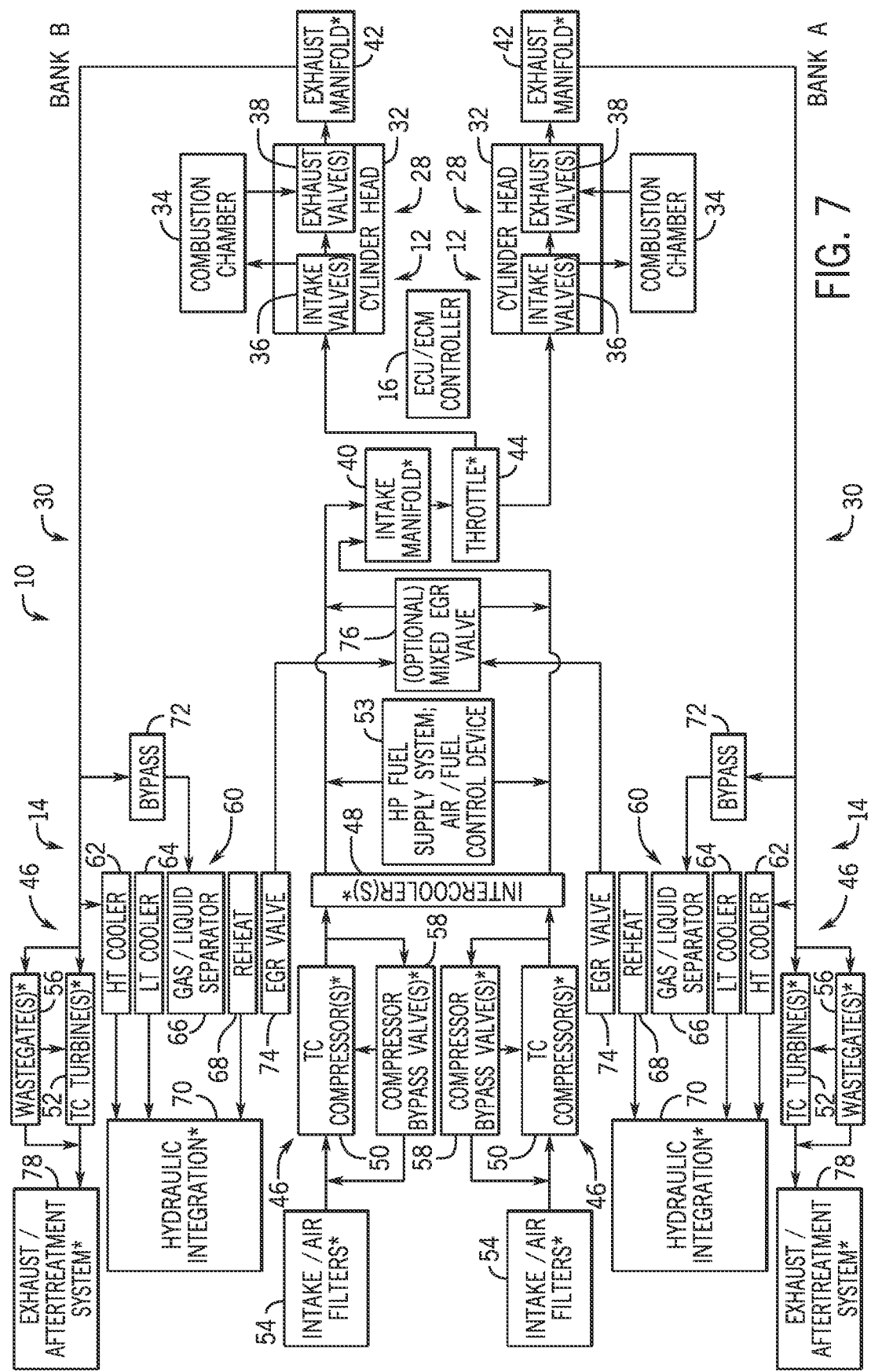
FIG. 7 is a schematic diagram of the engine driven power generation system of FIG. 1 utilizing a high pressure loop EGR system (e.g., sharing an intake manifold), in accordance with an embodiment.
Figure 8:
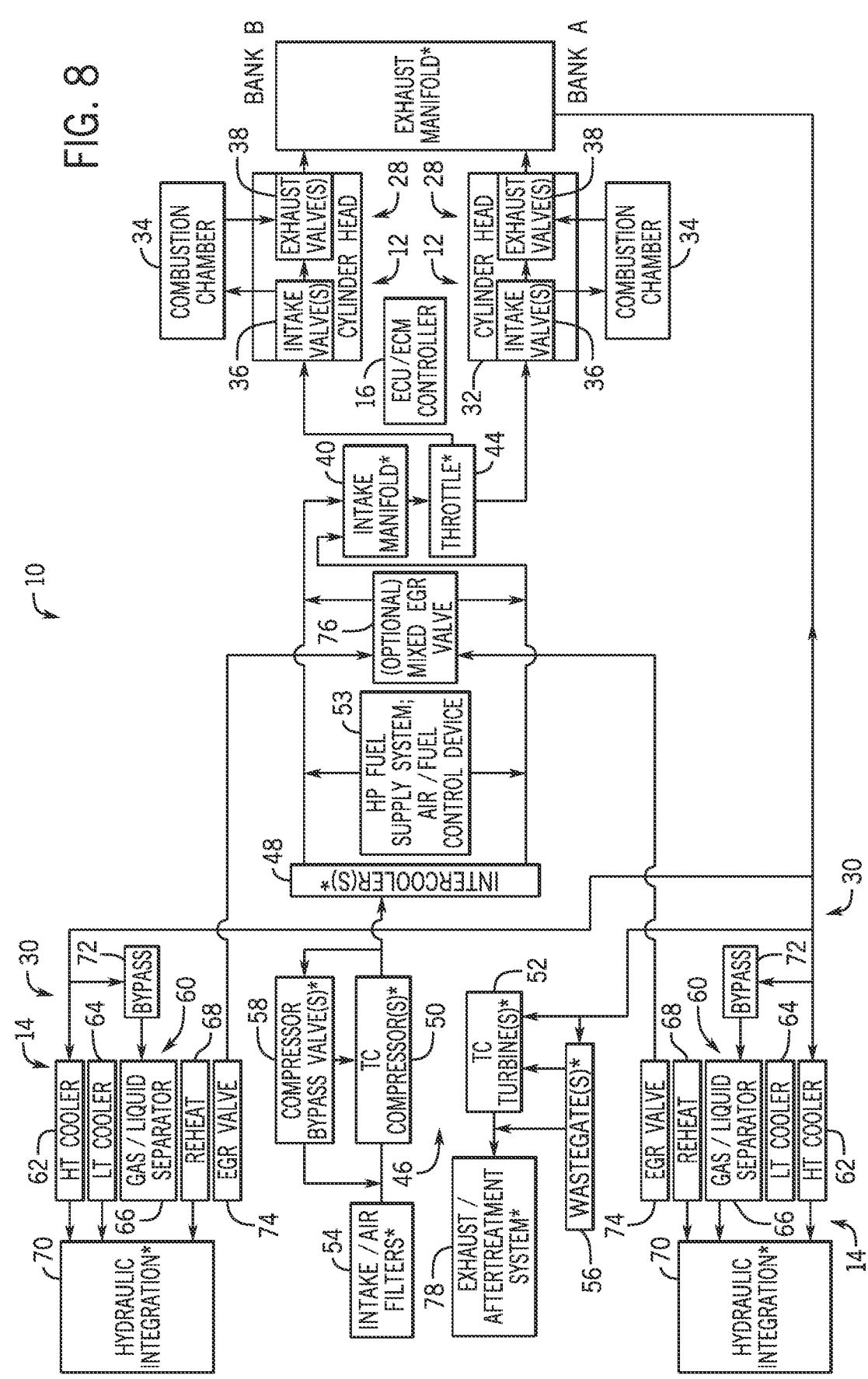
FIG. 8 is a schematic diagram of the engine driven power generation system of FIG. 1 utilizing a low pressure loop EGR system (e.g., sharing an intake manifold and an exhaust manifold), in accordance with an embodiment.

As mentioned above, certain components of the system 10 may be shared (e.g., across the cylinder banks 28). FIG. 7 is a schematic diagram of the engine driven power generation system 10 of FIG. 1 utilizing a high pressure loop EGR system (e.g., sharing the intake manifold 40). The system 10 depicted in FIG. 7 is as described in FIG. 6 except the following components are shared across the cylinder banks 28 to accommodate sharing the intake manifold 40: the intercoolers 48, the intake manifold 40, and the throttle 44. FIG. 8 is a schematic diagram of the engine driven power generation system 10 of FIG. 1 utilizing a high pressure loop EGR system (e.g., sharing the intake manifold 40 and an exhaust manifold 42). The system 10 depicted in FIG. 8 is as described in FIG. 6 except the following components are shared across the cylinder banks 28 to accommodate sharing the intake manifold 40 and the exhaust manifold 42: the intake 54, the wastegate 56, the compressor bypass valve 58, the intercoolers 48, the intake manifold 40, the throttle 44, the turbocharger 46 (including the compressor 50 and the turbine 52), the exhaust aftertreatment system 78, and the exhaust manifold 42. In these embodiments, other components may be shared.

As described below, management of the multiple EGR circuits 30 and EGR cooler units 60 provides the EGR system 14 with increased functionality. For example, the EGR circuits 30 and the EGR coolers units 60 may be managed to reduce the thermal mass of the EGR system 14 via a sequential warm-up of the EGR system 12. Thermal mass is a property of the mass which enables it to store heat, providing inertia against temperature fluctuations. For a reciprocating internal combustion engine, in general, it can be described as having two distinct temperatures that it can experience: operational temperature and ambient temperature. Operational temperature may be described as the steady-state temperature of a fully functioning engine, or critical EGR flow component that has the potential to produce condensate, that is enabled to run at rated power (speed and load), which is generally referred to as warmed-up. Operational temperature may also be a predefined constant value input. Ambient temperature can best be described as the current environmental temperature surrounding the engine and the lowest possible temperature that the engine could achieve if allowed to equalize, or a predefined constant value input. Theoretically, the maximum temperature change an engine could undergo starts at the ambient temperature and warms until the operational temperature is achieved. Similarly, any engine not producing power, potentially requiring no EGR flow, and an engine at its maximum power, potentially requiring maximum EGR flow, will continuously increase EGR flow between these two extremes. The intent is to limit the thermal mass required to be warmed that interfaces with the EGR flow and is at risk of producing condensation, by being colder than the dew point of the fluid. A transition temperature may be defined manually. Alternatively, one could define a transition temperature, between these two temperatures, where $0 < C \leq 1.0$ in the following equation:

$$T_{Transition} = T_{Ambient} + C(T_{Operation} - T_{Ambient}).$$

In certain embodiments, C may less than or equal to 1.0, 0.9. 0.8, 0.7, 0.6, or 0.5 or any number therebetween. For example, if C is less than or equal to 0.5, it enables a simple average between the two conditions.

Alternatively, the transition temperature may be independently defined irrespective of the operational or ambient temperature. For example, while maintaining some margin from the condensing temperature (dew point) of exhaust, commercial quality natural gas (CQNG) burned with zero excess air, at atmospheric pressure, is approximately 57.2°

C. (135° F.). Alternatively, the transition between a hot start and a cold start may be substituted for a predefined constant value input of time since time and temperature are directly related via heat transfer principles. On an engine start, cranking at a minimum speed by an external motive force, the transition temperature will be used as a threshold to define two states: first, if $T<T_{Transition}$, this will be defined as a cold start and, second, if $T>T_{Transition}$, this will be defined as a hot start. The purpose of the transition temperature is to create a threshold to balance between the thermal mass advantage of reusing hardware that is already above ambient temperature and mechanical wear and tear or degradation due to thermal low cycle fatigue cumulative damage, fouling by deposits from the EGR fluid, and other issues.

An EGR usage objective function will also need to be defined. The purpose of this usage objective function is to quantify mechanical wear and tear or degradation on different components of an EGR loop in parallel and capable of being independently controlled. The EGR usage objective function may be, but is not necessarily limited to duty cycle (engine power and time), number of starts, total EGR volume flowed, total coolant volume flowed, based on sensors, user input override, or other factors. When cranking is initiated as a cold start, at least one of the multiple EGR parallel circuits 30 will be used first, according to the EGR usage objective function. This will occur until the requirement of EGR flow, based on the engine operation necessitates more than one EGR parallel circuit 30 to be used simultaneously. No two immediately subsequent cold start events will use the same one of the multiple EGR parallel circuits 30 first. When cranking is initiated as a hot start, at least one of the multiple EGR parallel circuits 30 will be used (e.g., activated) first, according to the EGR usage objective function. This will occur until the requirement of EGR flow, based on the engine operation necessitates more than one EGR parallel circuit 30 to be used simultaneously. Any hot start events will use the same one of the multiple EGR parallel circuits 30 last identified for use by the EGR usage objective function during a cold start.

During a cold restart, only one EGR circuit 30 is initially utilized since there is only half (or less than half if more than two EGR circuits are present in parallel) the amount of mass that the EGR circuit 30 needs to heat up. Initially, during startup of the engine 12, in the EGR circuit that is first utilized, the bypass valve 72 is fully opened or turned on to enable the EGR flow to flow to the separator 66 and bypass the thermal mass of coolers 62, 64. Gradually the bypass valve 72 is closed or turned off as the EGR cooler unit 60 comprised of a high temperature non-condensing cooler 62 and/or a low temperature condensing cooler 64 reaches its target temperature. In certain embodiments, the bypass can be used as supplemental to a reheater 68. Once the maximum amount of cooling that is possible is achieved with the initial EGR circuit 30 but more cooling is needed, then utilization of another EGR circuit 30 is initiated in the same manner as the initial EGR circuit 30 (e.g., initial utilization of the bypass valve 72). During a hot restart, the EGR circuits 30 are sequentially utilized in the same manner but utilization of the bypass is skipped.

Figure 9:
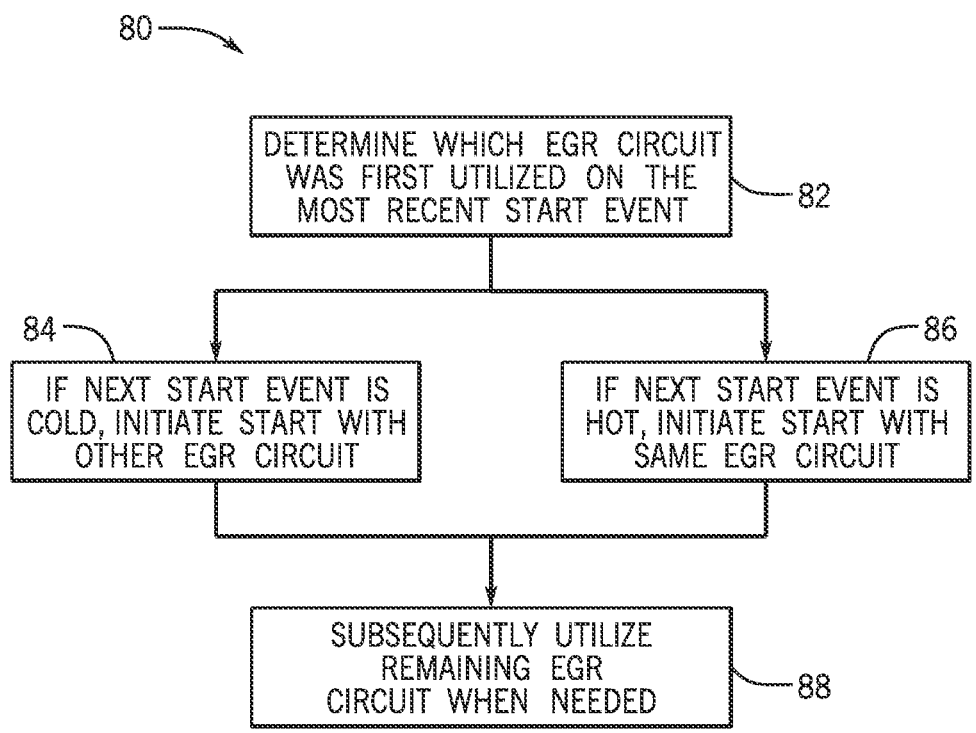
FIG. 9 is a flow chart of a method for utilization of an EGR system during a sequential warm-up of the engine driven power generation system of FIG. 1, in accordance with an embodiment.

FIG. 9 is a flow chart of a method 80 for utilization of an EGR system during a sequential warm-up of the engine driven power generation system of FIG. 1. In certain embodiments, all or some of the operations or steps illustrated in the method 80 may be performed by the processor 24 of the ECM 16. For example, the processor 24 may execute programs to execute data stored on the memory 26. The method 80 includes determining which EGR circuit 30 (and EGR cooler unit 60) was first utilized (e.g., activated) on the most recent start event (e.g., hot or cold start) (block 82). The method 80 also includes, if the next start event is a cold start or restart, initiating start or restart with EGR circuit 30 that was not first utilized on the most recent start or restart (block 84). The method 80 further includes, if the next start is a hot start or restart, initiating start or restart with the same EGR circuit 30 that was first utilized on the most recent start or restart (block 86). The method 80 even further includes subsequently utilizing the remaining EGR circuit 30 (i.e., the EGR circuit 30 that is not initially utilized in the current start or restart) when needed (i.e., when the controller detects, based on feedback received from sensors, that an operating parameter of the industrial combustion engine is approaching an outer limit of a specified range) (block 88). As noted above, depending on the type of restart, the bypass valves 72 may or may not be utilized. Utilization of the sequential warm-up of the EGR circuits 30 reduces the thermal mass of the EGR system 14.

Another functionality enabled by the multiple EGR circuits 30 in the EGR system 14 is EGR distribution management. The multiple EGR circuits 30 (e.g., parallel circuits) may differ in their fluid flow behavior. This difference may be present during initial manufacture or maintenance or could manifest itself over time due to operation. Source of differing fluid flow behavior may include, but are not necessarily limited to: variations in manufacturing tolerances, incorrect installation, incorrect maintenance, different maintenance stages, difference in flow losses (different in circuit length, pipe bends, constrictions, etc.), external heat sources (radiation, convection, conduction), accumulation of fouling by deposits, difference in secondary coolant flow temperatures or flow rates, difference in applied backpressure (location of EGR extraction), difference in applied downstream pressure (location of EGR outlet), additional flow stream connections to EGR circuits (closed crankcase ventilation (CCV) gases, abnormalities in supply or demand of EGR (compressor stall, misfire, backfire (intake deflagration), afterfire (exhaust deflagration)), leakages in the EGR circuit, restrictions caused by gas/liquid separation or condensate, restricted range of motion of EGR valves, clogged filter elements, and other issues. Different components of an EGR loop in a parallel circuit, capable of being independently controlled, may be operated independently to maintain the total EGR flow to the engine 12 that represents the summation of EGR output from at least two EGR circuits 30 in parallel. The flow contributions from each of the EGR loops in a parallel circuit may not necessarily be equal. In certain embodiments, the ECM 16 manages a respective amount of the EGR flow utilized from each EGR circuit 30 based on a respective amount of fouling present in the EGR circuit 30 (e.g., detected by the ECM 16 via sensors deposited through the system 10). For example, the EGR circuit 30 with less fouling may be utilized to contribute the majority of the EGR flow provided to the engine 12.

A further functionality enabled by the multiple EGR circuits 30 in the EGR system 14 is a limp-home mode. Limp home mode is a safety system designed to protect the engine 12 from being damaged during abnormal operation, as detected by diagnostics. Once limp-home mode engages, the engine 12 will only run at reduced speed, reduced load, or reduced power. Limp-home mode enables continued operation, although at a derate, until a convenient time that servicing to repair the abnormal operating condition can be arranged. With multiple EGR parallel circuits 30, should there be a total or partial failure that would reduce the EGR capability compared to the current engine demand for EGR, then engine derate will occur until the level of EGR can be safely provided by the whole EGR system 14. In certain embodiments, the engine derate may be accompanied by complete deactivation of entire portions of one or more of the multiple EGR parallel circuits 30. In certain embodiments, all EGR flow is halted and the engine 12 runs at the maximum power achievable without diluent (e.g., ~40% rated power). In certain embodiments, when one of the EGR circuits 30 is disabled, the ECM 16 reduces power of the engine 12 enough to enable utilization of the non-disabled EGR circuit 30 of the EGR circuits 30.

An even further functionality enabled by the multiple EGR circuits 30 in the EGR system 14 is online manipulation of EGR heat rejection. Multiple EGR parallel circuits 30 are likely to each include a respective EGR cooler unit 60 as described above with multiple functional sections. When more than one EGR circuits 30 in parallel are operated in concert, each component of each respective EGR circuit 30 (including components of the EGR cooler units 60) may be independently controlled as to maintain the thermophysical state of the combined EGR fluid output to the engine 12 from these parallel circuits. The thermophysical state of the combined EGR fluid output may be uniquely defined by its temperature, pressure, liquid mass flow rate, gas mass flow rate, volumetric concentrations of each chemical component ($CO_2$, CO, $NO_x$, $N_2O$, VOCs, HC, $CH_2O$, $NH_3$, etc.). Liquid mass flow rate and gas mass flow rate may be alternatively expressed as a relative or absolute humidity value. Differing volumetric concentrations of each chemical component may occur due to the following: misfire, backfire (intake deflagration), afterfire (exhaust deflagration), incomplete combustion, variations in air fuel equivalence ratio, variations in diluent ratio, damage to components that interact with combustion, differences of in-cylinder ash or deposit buildup, and other issues. Independent control of each respective EGR circuit 30 will impact the heat balance, losses or rejection, from the engine 12 to the environment or balance of plant (BoP). This rejection may be optimized (minimized or maximized) by the application needs. For example, heat losses to BoP may be maximized in applications of combined heat and power (CHP) where the heat energy can be usefully harnessed. For example, heat losses to BoP may be minimized in applications where the heat energy cannot be usefully harnessed and is sent to an ultimate heat sink (UHS), typically the ambient environment, and the capacity of heat flow of the BoP may be limited. Common situations where the heat rejection to the environment is limited is during hot, sunny, humid days or in situations where there is a limit on available utility or environmental water flow. In one example, the ECM 16 may manipulate the EGR heat rejection by maintaining the EGR flow from one of EGR circuits 30 at a cooler temperature (e.g., by shutting the reheater 68 of the EGR cooler unit 60 for the EGR circuit 30) than the EGR flow from the other EGR circuits 30. Manipulation of the EGR heat rejection may done via control of the primary fluid (EGR) or the secondary fluid (coolant) to the EGR circuits 30.

A still further functionality enabled by the multiple EGR circuits 30 in the EGR system 14 is ultrafine EGR mass flow resolution control. With multiple EGR parallel circuits 30, it is possible to have at least two EGR flow control valves in series/parallel configuration with each other as described above in FIGS. 3-8. For example, as described above, the EGR valves 74 of each parallel EGR circuit are parallel with respect to each other, while the shared EGR valve 76 is arranged in series with respect to each of the EGR valves 74. In situations where two EGR valves are in series (e.g., EGR valve 74 to EGR valve 76), there is the potential for ultrafine EGR mass flow resolution control functionality beyond what would normally be possible. Valves typically have limitations on their functionality such as deadband (e.g., if there is significant play in the valve actuator system and there will be a period when the valve does not move), minimum positioning precision/resolution of the controlling actuators, dithering between two positions to pseudo-replicate an intermediary flow position that is not possible, turndown ratio (referring to the width of the operational range of a device, and is defined as the ratio of the maximum capacity to minimum capacity), and other limitations. With two EGR valves in series it is possible to use a strategy of a course adjustment and a fine adjustment of the EGR mass flow. The combination of the valve actuation is of finer flow control resolution than each of the EGR valves separately. Functionally, this is important for an engine using EGR because the location of maximum efficiency is typically near a border of the combustion operating range/window (e.g., knock border, exhaust gas temperature limit, misfire limit, peak firing pressure limit, etc.). This manipulation of the EGR valves enables maintaining maximum efficiency of the engine without allowing variations in EGR flow to cause combustion to operate outside of its designed combustion operating range/window (e.g., knock border, exhaust gas temperature limit, misfire limit, peak firing pressure limit, exhaust emissions aftertreatment system operation window, etc.) where the mechanical health or emissions compliance of the engine would be at risk. In certain embodiments, the ECM 16 manages the EGR flow to the engine by completely opening the EGR valves 74 of the EGR circuits and modulating the shared EGR valve 76 to adjust the flow of EGR flow to the engine. In another embodiment, the ECM 16 manages the EGR flow to the engine by completely opening the shared EGR valve 76 and modulating the EGR valves 74 to adjust the EGR flow to the engine. In a further embodiment, the ECM manages the EGR flow by partially opening the EGR valves 74, 76 to adjust EGR flow to the engine.

In certain embodiments, with the EGR valves 74, 76 arranged in a series/parallel configuration as described above, EGR valve failure may be overcome. For example, in situations where two valves are in series, there is the potential for continued EGR control even in the event of one valve failing (stuck full open, stuck full closed, stuck partly open) or its corresponding actuator. This is possible by compensating with the other valves in the series/parallel configuration. For example, if a downstream valve (e.g., EGR valve 76) in a series flow configuration fails partially closed, EGR flow mass may be partially recovered by increasing the system differential pressure or gas flow velocity by reducing operational margins. One method of controlling differential pressure is by altering the hydraulic resistance, variable-geometry turbocharger, variable valve timing, EGR pumps or blowers. In another example, if a downstream valve (e.g., EGR valve 76) in a series flow configuration fails fully open, full EGR flow control can be maintained via the upstream valves (e.g., EGR valves 74). In an even further example, if an upstream valve (e.g. EGR valve 74) in a series flow configuration fails fully closed or partially closed, the EGR flow mass may be partially recovered by increasing the system differential pressure or gas flow velocity by reducing operational margins and increasing flow through the other EGR parallel circuits. In a still further example, if an upstream valve (e.g. EGR valve 74) in a series flow configuration fails fully open, full EGR flow control may be maintained via the downstream valve (e.g., EGR valve 76) and the valves (e.g., EGR valves 74) for the other parallel EGR circuits. The only situation that may not be overcome is if the downstream valve (e.g., EGR valve 76) fails fully closed. If this situation were to occur, the previously described limp-home mode functionality is utilized.

A yet further functionality enabled by the multiple EGR circuits 30 in the EGR system 14 is to target gas/liquid separation efficiency by managing the EGR cooler units 60 of the EGR circuits 30. The goal is to supply a controlled amount of EGR and liquid mass flow. The reason being is that both exhaust gas and water (in a liquid or vapor state) act as a diluent to combustion. It is important to have control of the liquid mass flow because too much liquid mass flow can cause erosion caused by high-speed liquid droplets that can decrease system efficiency as well as cause other complications (e.g. liquid in intake manifold, intercoolers, cylinder liners, spark plug short-circuit, etc.) or too little liquid mass flow could cause combustion knocking. Superheating is one way to do this, but immediately upon leaving the EGR heat exchangers the exhaust gas will lose heat and potentially condense as it travels throughout the system. Liquid droplet formation, of varying diameters, always occurs when a gaseous component is cooled below its dew point. Superheating may occur at approximately 25 to 30° C. above the dew point of the fluid. The condensing temperature (dew point) of exhaust, commercial quality natural gas (CQNG) burned with zero excess air, at atmospheric pressure, is approximately 57.2° C. (135° F.).

Another method of controlling the liquid mass flow in EGR is utilizing a gas/liquid separator, which can vary in type and style (e.g. mesh, vanes, cyclones, fiber-beds, etc.). A gas/liquid separator is simply a device which retains liquid droplets, entrained by a gas flow. Gas/liquid separation operate via several mechanisms (e.g. inertia (gravity being a special case), direct interception, diffusion (Brownian motion), electrostatic attraction, etc.). Each mechanism will have its own separation efficiency that is not constant throughout the range of application, operation, or service life. The overall gas/liquid separation efficiency, by all the combined mechanisms, is also not constant throughout the range of application, operation, or service life. Complete, i.e. 100 percent, separation efficiency of all liquid droplets from a gas is unrealistic. For this reason, overall gas/liquid separation efficiencies are commonly expressed as the definite integral between limiting separation minimum and maximum droplet diameters. The range of limiting separation droplet diameters should match the intended application. It is important to note, the limiting droplet diameter, and thus the overall gas/liquid separation efficiency, is a reciprocal function of the gas velocity. The overall gas/liquid separation efficiency increases with increasing gas flow velocity up to the flooding limit. The flooding limit is where agglomerated droplets in a gas/liquid separator are large enough that the shear force from the gas velocity can disengage droplets (i.e., re-entrainment (liquid carry-over)) from the liquid surface. Re-entrainment is an indication of operation of a gas flow velocity or liquid mass above what the system is designed to handle. The maximum gas flow velocity corresponding to the flooding limit varies based on system design. In general, a wire-based separator maximum gas flow velocity should be kept below 3 to 5 m/s and a vane-based separator be kept below 10 m/s. It is not uncommon to use wire-based and vane-based separators in series to agglomerate liquid droplets in the first wire-based stage, that is purposefully operating at or beyond the flooding limit, such that re-entrainment (liquid carry-over) of larger course droplets occurs to be effectively separated by the second vane-based separator; resulting in a higher overall gas/liquid separation efficiency for the multi-stage system. It should be noted, that directional changes and pressure differentials in the EGR system, outside of the gas/liquid separators, can be a cause of re-entrainment at flow velocities as low as 10 m/s. EGR system gas velocities do not typically exceed 30 m/s. The design velocity should be about 75% of the maximum gas flow velocity of the flooding limit maximum gas velocity, should it be desired to avoid this regime, to provide an acceptable margin.

It is typical for a gas/liquid separator to have a range where a minimum in overall separation efficiency is observed due to transitions of each mechanism having its own separation efficiency. It is generally agreed there are seven parameters, in three categories, which affect the separation efficiency. These categories include: 1) geometric parameters such as characteristic target separator dimensions and droplet size, referring to their aerodynamic diameter; 2) flow parameters such as gas velocity, pressure drop, and steadiness or uniformity of flow; and 3) physical properties such as liquid droplet density, gas density, gas viscosity (all of which are a function of temperature and pressure). While an engine is online, only a limited number of operational variables can be manipulated to optimize to affect the overall gas/liquid separation efficiency (e.g., gas velocity, pressure drop, and temperature). If a predefined low temperature condensing cooler subcooling and reheater superheat is employed, gas velocity and pressure drop are the only operational variables to be manipulated to optimize to affect the overall gas/liquid separation efficiency. Through the management of multiple EGR coolers 60, the engine diluent demand requirement can be balanced between multiple EGR coolers 60 to target a specific separation efficiency of the EGR system 14. In practice, this target separation efficiency is accomplished by an EGR determiner in the ECM 16 based on inputs from performance sensors(s) (e.g., sensors 18) and other optional inputs related to the EGR system 14. The EGR transfer function may contain constants, variables, fluid properties, empirical correlations, historically stored data, weighted objective functions, physical dimensions, formulae or other mathematical operations, logic, or models. Thus, in certain embodiments, the ECM 16 (e.g., at low engine load) may asynchronously modulate the EGR valves 74, 76 to reach a target gas/liquid separation efficiency range for the EGR system 14 while maintaining the total EGR supply, both exhaust gas and water vapor (limiting liquid water mass flow), to reach an engine diluent demand by maintaining a higher gas velocity in one of the EGR circuits 30, providing the majority of the exhaust to the engine as separation efficiency increases with increasing gas flow velocity up to the flooding limit, with the remainder of the coolers at a lower velocity fulfilling the remainder of the engine diluent demand. For example, the ECM 16 may maintain a higher gas velocity of the biased EGR loop to stay within an optimum gas/liquid separation efficiency range of the gas liquid separator(s) 66, as one or more EGR cooler modules in the restricted EGR circuit 30 may have their secondary fluid flow limited or disabled altogether.

FIG. 10 depicts an illustrative ECM 16 for use in controlling the air/fuel mixture and an amount of EGR supplied to the combustion chambers of the industrial combustion engine 12. FIG. 10 is a non-limiting example of the ECM 16. Collectively, the air/fuel mixture, the EGR, and any other diluents supplied to the combustion chamber are referred to herein as the intake charge. The illustrative ECM 16 of FIG. 10 receives an input of engine state parameters from the sensors 18, which, in this instance, may include a torque indicating characteristic sensor 90, such as an IMAP or IMD sensor, an engine speed sensor 92, an engine performance sensor 94, and diagnostic sensors 95 and outputs a signal to the actuators 20. The ECM 16 may also receive additional inputs 96, discussed in more detail below. The additional inputs 96 may include intake manifold pressure and a fuel quality input. Additional, fewer, or different additional inputs may be used in other implementations. The actuators 20 include at least an air/fuel control device 98 operable to control a ratio of air and fuel supplied to the engine 12. Examples of air/fuel control devices 98 include a fuel pressure regulator or air bypass in an engine system using a fixed orifice area air/gas mixer, an adjustable orifice area air/gas mixer, one or more fuel injectors, or other air/fuel control device or combination of devices. The actuators 20 may also include one or more EGR control devices 100 (e.g., a plurality of EGR actuators, a plurality of EGR bypasses, etc.) for introducing an amount of EGR to the engine 12. Other examples of EGR control devices 100 include vacuum regulators, pressure regulators, a combination pressure and vacuum regulator, servo control valves, combination servo control valve and vacuum regulator, variable area valves (e.g., butterfly valves, gate valves, and ball valves), and combination servo control valve and pressure regulator, or other regulator.

In one implementation, the ECM 16 may include a lambda set-point determiner 102 that receives one or more engine state parameters and determines and outputs a lambda (k) set-point. The lambda set-point is selected to maintain engine operation substantially in steady state, for example. Lambda is a term that commonly refers to an air-fuel equivalence ratio in which a lambda value of 1 refers to a stoichiometric air/fuel mixture. Specifically, lambda is the actual air-fuel ratio divided by the stoichiometric air-fuel ratio. The lambda set-point determiner 102 is used to determine an air/fuel actuator control signal operable to control the air/fuel control device 98. Although FIG. 10 illustrates an implementation where the lambda set-point is the only input to control the air/fuel control device 98, additional or different inputs may be used to determine the air/fuel actuator control signal. For example, certain implementations may use a fuel parameter for compensating for variances in fuel quality or type or engine wear, damage, or modification, in combination with the lambda set-point to determine the air/fuel actuator control signal. In determining a lambda set-point, the illustrative ECM 16 uses engine speed from the engine speed sensor 92, a torque indicating characteristic (e.g., IMAP or IMD) from the torque indicating characteristic sensor 90 and optionally other inputs 96. In some instances, the optional inputs 96 may include ambient temperature, intake temperature (e.g., intake manifold pressure), and/or a fuel parameter. According to certain implementations, the torque indicating characteristic sensor 90 is operable to determine an expected or estimated torque output of the engine 12. Moreover, the torque indicating characteristic sensor 90 may include any sensor, instrument, or device for sensing or otherwise determining a torque output or power output of the engine 12, since, as discussed in detail below, converting between power output and torque output is possible using known engineering relationships. The ECM 16 may use other sensors alternatively or in combination with those discussed above, such as a mass-air sensor, flow volume sensor or other sensor (e.g., diagnostic sensors 95).

In certain implementations, the lambda set-point determiner 102 may determine the lambda set-point using a look-up table in the memory of the ECM 16 including at least values indicative of engine speed and torque indicating characteristics correlated to lambda set-points determined to maintain a specified engine operation state, such as steady state engine operation. Alternately or in combination with a look-up table, the lambda set-point determiner 102 may determine the lambda set-point using a formulaic calculation as a function of inputs from one or more of the sensors 18, for example, engine speed and torque indicating characteristic. In either instance, the lambda set-point is selected in relation to the respective engine speed and torque indicating characteristic values to provide a specified combustion mixture to the engine 12 to maintain a specified engine operating state, such as steady state operation. Therefore, different lambda set-points may effectuate different engine operating states.

The ECM 16 may also include a lambda set-point error determiner 104 for determining an error or difference between the determined lambda set-point and an input indicative of the actual lambda. For example, an error may be determined when the engine 12 is under transient conditions, e.g., whenever the engine's actual lambda condition does not correspond to the lambda set-point, for example. In certain implementations, the lambda set-point error determiner 104 may determine a lambda adjustment 106, i.e., a signal representative of an amount by which to adjust operation of the engine 12.

The lambda sensor 108 measures the actual lambda condition of the engine 12 at any given time by, for example, measuring the amount of oxygen remaining in exhaust gases and sends a corresponding signal to the lambda set-point error determiner 104. The lambda set-point error determiner 104 then compares the actual lambda condition with a lambda set-point received from the lambda set-point determiner 104. The lambda set-point error determiner 104 then determines the amount by which the actual lambda condition should be adjusted (e.g., increased or decreased) in order to achieve a specified engine performance and generates a lambda adjustment 106. That is, based on the comparison between the actual lambda condition and the lambda set-point, an adjustment may be determined if the comparison indicates a deviation between the two values. The lambda set-point error determiner 104 then outputs the lambda adjustment 106 (a positive or negative value, for example) to an actuator transfer function 109. The actuator transfer function 109 receives at least the lambda adjustment 106 and determines an air/fuel actuator control signal adapted to operate the air/fuel control device 98.

The ECM 16 also includes an EGR determiner 110 for determining the EGR flow rate for the one or more EGR circuits. In certain embodiments, the ECM 16 includes an EGR transfer function 112 that receives at least an EGR set-point signal and determines EGR actuator control signals adapted to operate the one or more EGR control devices 100. The EGR transfer function 112 may determine the EGR actuator control signal using a look-up table correlating, for example, throttle position, lambda set-points, fuel parameters, and any other inputs to affect the EGR actuator control signals; by calculation as a function of the EGR set-point, and any other inputs; by a combination of a look-up table and a calculation; or by another method. According to one implementation, the EGR set-point can be transformed to a pre-signal using a look-up table, and a different parameter applied, such as a fuel parameter, in a calculation to offset the pre-signal in determining the EGR actuator control signal. An amount of EGR introduced into the engine 12 may depend upon operating conditions of the engine (e.g., based on feedback from the sensor 18), such as a torque indicating characteristic, an engine speed, a power output of the engine, an input-based determination of power output of the engine, an air/flow actuator control signal, and others, such as an air/fuel mixture temperature, for example. The EGR flow rate may also be determined as described above.

Technical effects of the disclosed embodiments include providing an engine driven power generation system that includes an EGR system with multiple EGR circuits. These multiple EGR circuits provide additional degrees of freedom in in managing the EGR system. In particular multiple EGR circuits, each with an EGR cooler unit, enables online manipulation of EGR heat rejection, utilization of one EGR circuit while the engine is derated if the other EGR circuit is disabled, EGR distribution management, sequential warm-up to reduce thermal mass, and other functionalities.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112 (f).

The invention claimed is:

1. A system, comprising:
    an industrial combustion engine comprising at least one intake system and at least one exhaust system;
    an exhaust gas recirculation (EGR) system coupled to the industrial combustion engine and configured to route exhaust gas generated by the industrial combustion engine from the at least one exhaust system to the at least one intake system, wherein the EGR system comprises:
        a first EGR cooler unit for a first set of cylinders of the industrial combustion engine disposed along a first EGR circuit; and
        a second EGR cooler unit for a second set of cylinders of the industrial combustion engine disposed along a second EGR circuit, wherein the first and second EGR cooler units each comprises at least two of a high temperature non-condensing cooler, a low temperature condensing cooler, an adiabatic gas/liquid separator, and a reheater;
        wherein the first and second EGR cooler units are coupled with first and second EGR valves, respectively, configured to enable flow of the exhaust gas from the first and second EGR circuits, respectively, to the industrial combustion engine; and
    a controller communicatively coupled to the industrial combustion engine and the EGR system, wherein the controller comprises a processor and a non-transitory memory encoding one or more processor-executable routines, wherein the one or more routines, when executed by the processor, cause the controller, via control signals sent to actuators, to manage flow of the exhaust gas to the industrial combustion engine by modulating the first and second EGR valves and wherein the one or more routines, when executed by the processor, cause the controller, when one of the first EGR circuit and the second EGR circuit is disabled, to send the control signals to the industrial combustion engine to reduce power of the industrial combustion engine to a power level that enables utilization of a non-disabled EGR circuit of the first EGR circuit and the second EGR circuit; and
    wherein the first and second EGR circuits each comprise a thermostatically controlled bypass valve that when open enables the exhaust gas to bypass each cooler within the first and second EGR cooler units, respectively, and wherein the one or more routines, when executed by the processor, cause the controller, via the control signals, to initially activate only one of the first EGR cooler unit or the second EGR cooler unit during a first cold start of the industrial combustion engine and then subsequently activate both the first EGR cooler unit and the second EGR cooler unit when the controller detects, based on feedback received from sensors, that an operating parameter of the industrial combustion engine is approaching an outer limit of a specified range.

2. The system of claim 1, wherein both the first EGR cooler unit and the second EGR cooler unit are coupled with a third EGR valve downstream of both the first and second EGR valves that is configured to enable flow of the exhaust gas to the industrial combustion engine.

3. The system of claim 1, wherein the one or more routines, when executed by the processor, cause the controller, via the control signals, to initially activate whichever of the first EGR cooler unit or the second EGR cooler unit was not activated during the first cold start of the industrial combustion engine during a second cold start of the industrial combustion engine, wherein the second cold start is the next start after the first cold start.

4. The system of claim 1, wherein the one or more routines, when executed by the processor, cause the controller, via the control signals, to initially activate the same EGR cooler unit of the first EGR cooler unit or the second EGR cooler unit that was activated during the first cold start of the industrial combustion engine during a subsequent hot start of the industrial combustion engine, wherein the subsequent hot start is the next start after the first cold start.

5. The system of claim 1, wherein the one or more routines, when executed by the processor, cause the controller, via the control signals sent to the actuators, to asynchronously modulate the first and second EGR valves to reach a target gas/liquid separation efficiency range for the EGR system to reach an engine diluent demand.

6. The system of claim 1, wherein the one or more routines, when executed by the processor, cause the controller, via the control signals, to adjust a respective amount of the exhaust gas utilized from the first and second EGR circuits based on a respective amount of fouling, detected by the controller based on feedback from the sensors, in the first and second EGR circuits.

7. The system of claim 1, wherein the one or more routines, when executed by the processor, cause the controller, when one of the first EGR circuit and the second EGR circuit is disabled, to send the control signals to the industrial combustion engine to reduce power of the industrial combustion engine to a power level that enables utilization of a non-disabled EGR circuit of the first EGR circuit and the second EGR circuit.

8. The system of claim 1, wherein the EGR system comprises a high pressure loop EGR system.

9. The system of claim 1, wherein the EGR system comprises a low pressure loop EGR system.

10. A system, comprising:
a controller communicatively coupled to an industrial combustion engine and an exhaust gas recirculation (EGR) system, wherein the EGR system is configured to route exhaust gas generated by the industrial combustion engine from at least one exhaust system to at least one intake system, the EGR system comprises a plurality of EGR circuits, each EGR circuit of the plurality of EGR circuits comprises an EGR cooler unit including at least two of a high temperature non-condensing cooler, a low temperature condensing cooler, an adiabatic gas/liquid separator, and a reheater, and wherein the controller comprises a processor and a non-transitory memory encoding one or more processor-executable routines, wherein the one or more routines, when executed by the processor, cause the controller, via control signals sent to actuators, to manage flow of the exhaust gas to the industrial combustion engine by completely opening respective EGR valves disposed along the plurality of EGR circuits and modulating a shared EGR valve shared by the plurality of EGR circuits downstream of the respective EGR valves to adjust the flow of the exhaust gas to the industrial combustion engine, by completely opening the shared EGR valve and modulating the respective EGR valves to adjust the flow of the exhaust gas to the industrial combustion engine, or partially open the respective EGR valves and the shared EGR valve to adjust the flow of the exhaust gas to the industrial combustion engine, and wherein the one or more routines, when executed by the processor, cause the controller, via the control signals, to adjust a respective amount of the exhaust gas utilized from the plurality of EGR circuits based on a respective amount of fouling, detected by the controller based on feedback from sensors, in each EGR circuit of the plurality of EGR circuits.

11. The system of claim 10, wherein the one or more routines, when executed by the processor, cause the controller, via the control signals, to initially activate only one EGR circuit of the plurality of EGR circuits during a first cold start of the industrial combustion engine and then subsequently activate each EGR circuit of the plurality of EGR circuits when the controller detects, based on feedback received from the sensors, that an operating parameter of the industrial combustion engine is approaching an outer limit of a specified range.

12. The system of claim 11, wherein the one or more routines, when executed by the processor, cause the controller, via the control signals, to initially activate whichever of the plurality of EGR circuits was not activated during the first cold start of the industrial combustion engine during a second cold start of the industrial combustion engine, wherein the second cold start is the next start after the first cold start.

13. The system of claim 11, wherein the one or more routines, when executed by the processor, cause the controller, via the control signals, to initially activate the EGR circuit of the plurality of EGR circuits unit that was activated during the first cold start of the industrial combustion engine during a subsequent hot start of the industrial combustion engine, wherein the subsequent hot start is the next start after the first cold start.

14. The system of claim 10, wherein the one or more routines, when executed by the processor, cause the controller, via the control signals, to asynchronously modulate the respective EGR valves to reach a target gas/liquid separation efficiency range for the EGR system to reach an engine diluent demand.

15. The system of claim 10, wherein the one or more routines, when executed by the processor, cause the controller, via the control signals to manipulate EGR heat rejection by maintaining the exhaust gas from one EGR circuit of the plurality of EGR circuits at a cooler temperature than the exhaust gas from the other EGR circuits of the plurality of EGR circuits.

16. The system of claim 10, wherein the one or more routines, when executed by the processor, cause the controller, when one of the EGR circuits of the plurality of EGR circuits is disabled, to send the control signals to the industrial combustion engine to reduce power of the industrial combustion engine to a power level that enables utilization of a non-disabled EGR circuit of the plurality of EGR circuits.

17. A method, comprising:
utilizing a controller communicatively coupled to an industrial combustion engine and an exhaust gas recirculation (EGR) system and comprising a non-transitory memory and a processor to:
initially activate, via control signals, only one EGR circuit of a plurality of EGR circuits of the EGR system during a first cold start of the industrial combustion engine and then subsequently activate each EGR circuit of the plurality of EGR circuits when the controller detects, based on feedback received from sensors, that an operating parameter of the industrial combustion engine is approaching an outer limit of a specified range; and
initially activate, via the control signals, whichever of the plurality of EGR circuits was not activated during the first cold start of the industrial combustion engine during a second cold start of the industrial combustion engine and initially activate the EGR circuit that was initially activated during the first cold start during a subsequent hot start of the industrial combustion engine, wherein the second cold start or the subsequent hot start is the next start after the first cold start, and wherein each EGR circuit of the plurality of EGR circuits comprises an EGR cooler unit that includes multiple functional sections.

* * * * *